United States Patent
Uemura

(10) Patent No.: US 9,987,838 B2
(45) Date of Patent: Jun. 5, 2018

(54) METHOD AND DEVICE FOR SEPARATING WORKPIECE CONSISTING OF CARRIER SUBSTRATE AND RESIN LAYER

(71) Applicant: FUK Co., Ltd., Nara (JP)

(72) Inventor: Mitsuo Uemura, Nara (JP)

(73) Assignee: Screen Laminatech Co., Ltd., Nara (JP)

( * ) Notice: Subject to any disclaimer, the term of this patent is extended or adjusted under 35 U.S.C. 154(b) by 0 days. days.

(21) Appl. No.: 15/591,201

(22) Filed: May 10, 2017

(65) Prior Publication Data

US 2017/0348960 A1    Dec. 7, 2017

(30) Foreign Application Priority Data

Jun. 7, 2016    (JP) .................................. 2016-113162

(51) Int. Cl.
*B32B 38/10*    (2006.01)
*B32B 43/00*    (2006.01)
(Continued)

(52) U.S. Cl.
CPC .......... *B32B 43/006* (2013.01); *B23K 26/402* (2013.01); *B23K 2203/50* (2015.10);
(Continued)

(58) Field of Classification Search
CPC . B32B 38/10; B32B 43/006; Y10T 156/1132; Y10T 156/1158;
(Continued)

(56) References Cited

U.S. PATENT DOCUMENTS 5,972,159 A * 10/1999 Uryu ...................... B29B 17/02
156/701
6,123,800 A *  9/2000 Freund .............. H01L 21/67132
156/707
(Continued)

OTHER PUBLICATIONS

Ukai Yukihiro, "Laser Lift Off (LLO): A Production Process for Flexible Organic EL Device", Trends in Organic EL Display, Organic EL Lighting, and Organic EL Material, Apr. 27, 2016 [searched online May 30, 2016], <URL: http://multitask1.seesaa.net/article/437179952.html>.

*Primary Examiner* — Mark A Osele
*Assistant Examiner* — Nickolas Harm
(74) *Attorney, Agent, or Firm* — Kirschstein, Israel, Schiffmiller & Pieroni, P.C.

(57) ABSTRACT

A separation method allows a carrier substrate and a resin layer to be separated without, for example, breaking the resin layer for use in a final product, such that the resin layer can be rendered easy to handle thereafter. A protection step coats the surface of a resin layer with a protective film. A holding-by-suction step retains by suction the coated resin layer on a suction stage with a flat suction surface. After the back surface of the carrier substrate is supported at or near a first end by a support roller capable of moving from the first end to a second end of the carrier substrate, a peeling step lowers the first end of the carrier substrate while moving the support roller toward the second end, thereby peeling the carrier substrate from the resin layer while bending the carrier substrate at a portion supported by the support roller.

7 Claims, 18 Drawing Sheets

(51) Int. Cl.
  *B23K 26/402* (2014.01)
  *B23K 103/00* (2006.01)
  *B32B 38/18* (2006.01)
(52) U.S. Cl.
  CPC ........... *B32B 38/10* (2013.01); *B32B 38/1858* (2013.01); *B32B 2310/0843* (2013.01); *B32B 2457/20* (2013.01); *Y10T 156/1132* (2015.01); *Y10T 156/1158* (2015.01); *Y10T 156/1174* (2015.01); *Y10T 156/195* (2015.01); *Y10T 156/1917* (2015.01); *Y10T 156/1944* (2015.01); *Y10T 156/1978* (2015.01)
(58) Field of Classification Search
  CPC ......... Y10T 156/1174; Y10T 156/1917; Y10T 156/1944; Y10T 156/195; Y10T 156/1978
  USPC ....... 156/707, 712, 715, 753, 758, 759, 764, 156/924, 937
  See application file for complete search history.

(56) References Cited

U.S. PATENT DOCUMENTS

| | | | | |
|---|---|---|---|---|
| 6,258,666 B1* | 7/2001 | Mizutani | ................. | C23C 16/01 156/241 |
| 6,290,805 B1* | 9/2001 | Freund | .............. | H01L 21/67132 156/701 |
| 6,629,553 B2* | 10/2003 | Odashima | ......... | H01L 21/67144 156/716 |
| 7,335,573 B2* | 2/2008 | Takayama | ......... | H01L 21/76251 257/E21.567 |
| 7,503,995 B2* | 3/2009 | Hayasaka | ........... | B29C 63/0013 156/247 |
| 8,137,050 B2* | 3/2012 | Yamada | ............ | H01L 21/67132 414/416.05 |
| 8,869,863 B2* | 10/2014 | Lee | ......................... | H01L 51/56 156/716 |
| 8,987,040 B2* | 3/2015 | Albrecht | ........... | B32B 17/10036 156/443 |
| 2006/0191633 A1* | 8/2006 | Hayasaka | ........... | B29C 63/0013 156/760 |
| 2008/0185100 A1* | 8/2008 | Jang | ....................... | B32B 43/006 156/714 |
| 2013/0020594 A1* | 1/2013 | Ahn | ....................... | H01L 33/007 257/88 |
| 2014/0008022 A1* | 1/2014 | Ahn | ....................... | B29C 69/006 156/378 |
| 2014/0299276 A1* | 10/2014 | Uemura | ................... | B29C 66/92 156/582 |
| 2015/0059986 A1* | 3/2015 | Komatsu | .................. | B26D 3/08 156/510 |
| 2015/0060933 A1* | 3/2015 | Ohno | .................. | H01L 51/5237 257/99 |
| 2015/0122427 A1* | 5/2015 | Koo | ....................... | B32B 43/006 156/707 |
| 2015/0155505 A1* | 6/2015 | Yamazaki | ............. | H01L 51/003 257/40 |
| 2016/0099388 A1* | 4/2016 | Jung | ....................... | H01L 22/24 438/16 |

* cited by examiner

METHOD AND DEVICE FOR SEPARATING WORKPIECE CONSISTING OF CARRIER SUBSTRATE AND RESIN LAYER

TECHNICAL FIELD

The present invention relates to a separation method and device for separating a workpiece, consisting of a rectangular carrier substrate and a substantially rectangular resin layer formed thereon, into the carrier substrate and the resin layer.

BACKGROUND ART

In recent years, studies have been conducted on various methods for producing flexible organic EL devices, which are expected to be applied to next-generation display devices, lighting devices, etc. One of such methods includes the step of applying polyimide or suchlike to a carrier substrate made of glass or suchlike, thereby forming a resin layer, the step of forming an array of light-emitting elements on the resin layer, a laser lift-off step for irradiating the resin layer with a laser beam from the back side of the carrier substrate, thereby breaking the bond between the carrier substrate and the resin layer, and a separation step for separating the unbound substrate and layer (see, for example, Non-Patent Document 1). Note that laser lift-off is also referred to as LLO from the initial letters thereof.

The resin layer separated from the carrier substrate in the separation step is used as an essential part of a flexible organic EL device (final product). On the other hand, the carrier substrate is, for example, discarded.

PRIOR ART DOCUMENT

Non-Patent Document

Non-Patent Document 1: "Laser Lift Off (LLO): A Production Process for Flexible Organic EL Device", Trends in Organic EL Display, Organic EL Lighting, and Organic EL Material, Apr. 27, 2016 [searched online May 30, 2016], <URL: http://multitask1.seesaa.net/article/437179952.html>

DISCLOSURE OF THE INVENTION

Problems to be Solved by the Invention

However, in the case of the aforementioned conventional production method, the resin layer separated from the carrier substrate in the separation step for use in the final product is thin and fragile, and therefore is extremely difficult to handle (e.g., for conveyance to the next step). Moreover, the laser lift-off step has a problem in that the bond between the peripheral portion of the resin layer and the carrier substrate cannot be broken completely. Accordingly, in the case of the conventional production method, the resin layer for use in the final product might be, for example, broken as a result of forcibly separating the resin layer and the carrier substrate while both are still bonded to each other.

The present invention has been achieved under the above circumstances, with a problem thereof being to provide a separation method and device allowing a carrier substrate and a resin layer to be separated without, for example, breaking the resin layer for use in a final product, in such a manner that the resin layer can be rendered easy to handle thereafter.

Solution to the Problems

To solve the problem, the present invention provides a separation method for separating a workpiece, consisting of a rectangular carrier substrate and a substantially rectangular resin layer, into the carrier substrate and the resin layer, the carrier substrate having a first end and a second end opposite the first end, the resin layer being formed on a surface of the carrier substrate, the method including (1) a protection step for coating a surface of the resin layer with a protective film, (2) a holding-by-suction step for retaining by suction the resin layer coated with the protective film on a suction stage with a flat suction surface, (3) a supporting step for causing a support roller to support a back surface of the carrier substrate at or near the first end, wherein the support roller is capable of moving from the first to the second end of the carrier substrate, and (4) a peeling step for lowering the first end of the carrier substrate while moving the support roller toward the second end, thereby peeling the carrier substrate from the resin layer while bending the carrier substrate at a portion supported by the support roller.

In the separation method, the resin layer is, for example, a polyimide layer formed by application to the surface of the carrier substrate, and includes a substantially rectangular element portion with an array of light-emitting elements formed therein and four edging portions surrounding the element portion.

Preferably, the separation method further includes (5) a laser lift-off step executed between the protection step and the holding-by-suction step to irradiate the resin layer with a laser beam from a back side of the carrier substrate, thereby breaking a bond between the resin layer and the carrier substrate.

In this case, more preferably, the separation method further includes (6) a first cutting step executed between the laser lift-off step and the holding-by-suction step to provide cuts in three of the edging portions, excluding the edging portion parallel to the first end of the carrier substrate, and (7) a second cutting step executed between the supporting step and the peeling step to provide a cut in the edging portion parallel to the first end of the carrier substrate.

Furthermore, to solve the problem, the present invention also provides a separation device for separating a workpiece, consisting of a rectangular carrier substrate and a substantially rectangular resin layer, into the carrier substrate and the resin layer, the carrier substrate having a first end and a second end opposite the first end, the resin layer being formed on a surface of the carrier substrate, the device including (1) a suction stage for holding the workpiece on the resin layer side by suction of a protective film provided in advance on the resin layer, the suction stage having a flat suction surface facing down, (2) a support roller for supporting a back surface of the carrier substrate from below, the support roller being capable of moving from the first end of the carrier substrate included in the workpiece being held by suction toward the second end, (3) a first-end support capable of ascending and descending in order to regulate up and down movement of the first end of the carrier substrate, (4) a second-end support capable of ascending and descending in order to regulate up and down movement of the second end of the carrier substrate, and (5) a control portion for controlling the movement of the support roller and the ascending and descending of the first-end support and the second-end support, wherein the control portion moves the support roller toward the second end while lowering the first-end support, thereby lowering the first end of the carrier substrate, without raising or lowering the second-end support, whereby the carrier substrate is peeled from the resin layer while being bent at a portion supported by the support roller.

In the separation device, the resin layer is, for example, a polyimide layer formed by application to the surface of the carrier substrate, and includes a substantially rectangular element portion with an array of light-emitting elements formed therein and four edging portions surrounding the element portion.

In the separation device, preferably, three of the edging portions of the resin layer, excluding the edging portion parallel to the first end of the carrier substrate, have cuts provided therein in advance.

In this case, more preferably, the separation device further includes (6) a cutter unit for providing a cut in the edging portion parallel to the first end of the carrier substrate.

Effect of the Invention

The present invention makes it possible to provide a separation method and device allowing a carrier substrate and a resin layer to be separated without, for example, breaking the resin layer for use in a final product, in such a manner that the resin layer can be rendered easy to handle thereafter.

MODE FOR CARRYING OUT THE INVENTION

Hereinafter, a separation method and device according to an embodiment of the present invention will be described with reference to the accompanying drawings.

Embodiment

Figure 1:
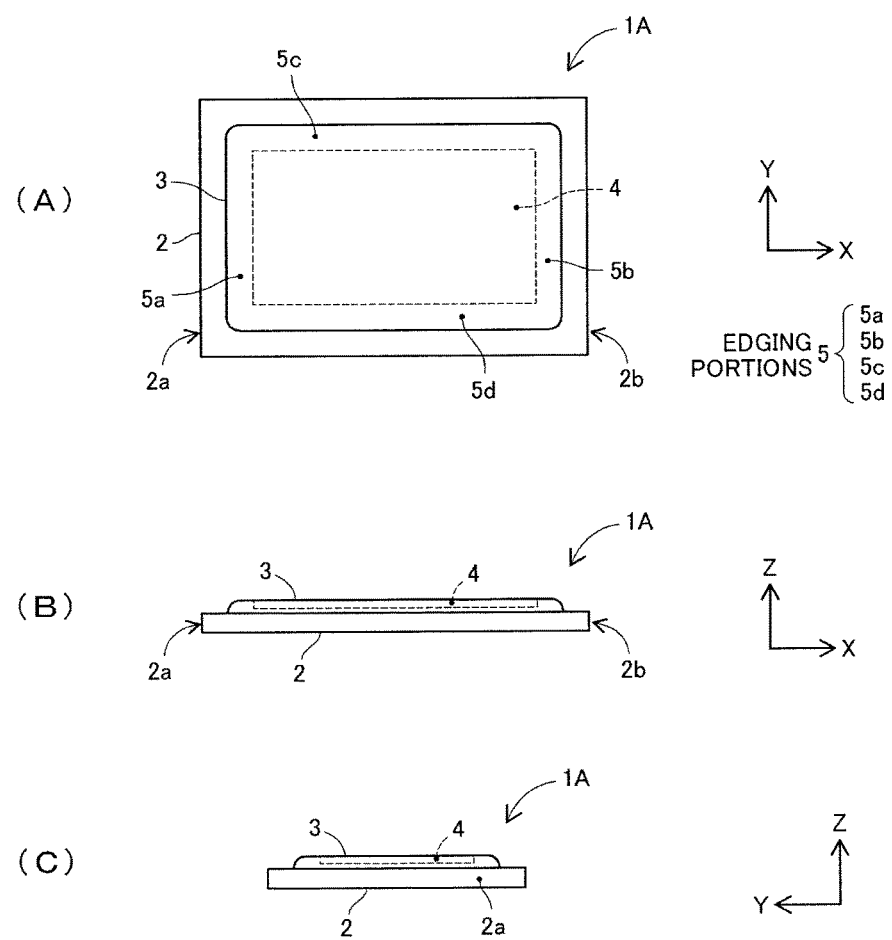
FIG. 1 provides (A) a top view, (B) a side view, as seen in the Y-axis direction, and (C) a side view, as seen in the X-axis direction, of a workpiece consisting of a carrier substrate and a resin layer.

FIG. 1 illustrates a workpiece 1A as a separation target. As shown in the figure, the workpiece 1A consists of a rectangular carrier substrate 2, which has a first end 2a and a second end 2b opposite the first end 2a, and a substantially rectangular resin layer 3 formed thereon. The carrier substrate 2 is a glass substrate with a thickness of from 0.5 to 1.1 mm. The resin layer 3 includes a polyimide layer formed by application of a polyimide resin and an array of light-emitting elements (organic EL elements) formed therein, and has a thickness of about 10 µm.

The resin layer 3 includes a substantially rectangular element portion 4, in which the array of light-emitting elements are formed, and four edging portions 5a, 5b, 5c, and 5d (also collectively referred to below as the "edging portions 5") surrounding the element portion 4. Of these, the edging portion 5a is proximal and parallel to the first end 2a of the carrier substrate 2. Also, the edging portion 5b is proximal and parallel to the second end 2b of the carrier substrate 2. The resin layer 3 is separated from the carrier substrate 2 by the separation method and device according to the present embodiment and thereafter used as an essential part of a flexible organic EL device, which is a final product.

It should be noted that in FIG. 1, the element portion 4 is buried in the polyimide layer, but the element portion 4 may protrude from the surface of the polyimide layer. The same applies to other side views (e.g., FIGS. 3 and 18).

Furthermore, the reference characters that denote the workpiece herein change in the order: 1A→1B(1B') →1C→1D→1E, in accordance with change of state of the workpiece.

Figure 2:
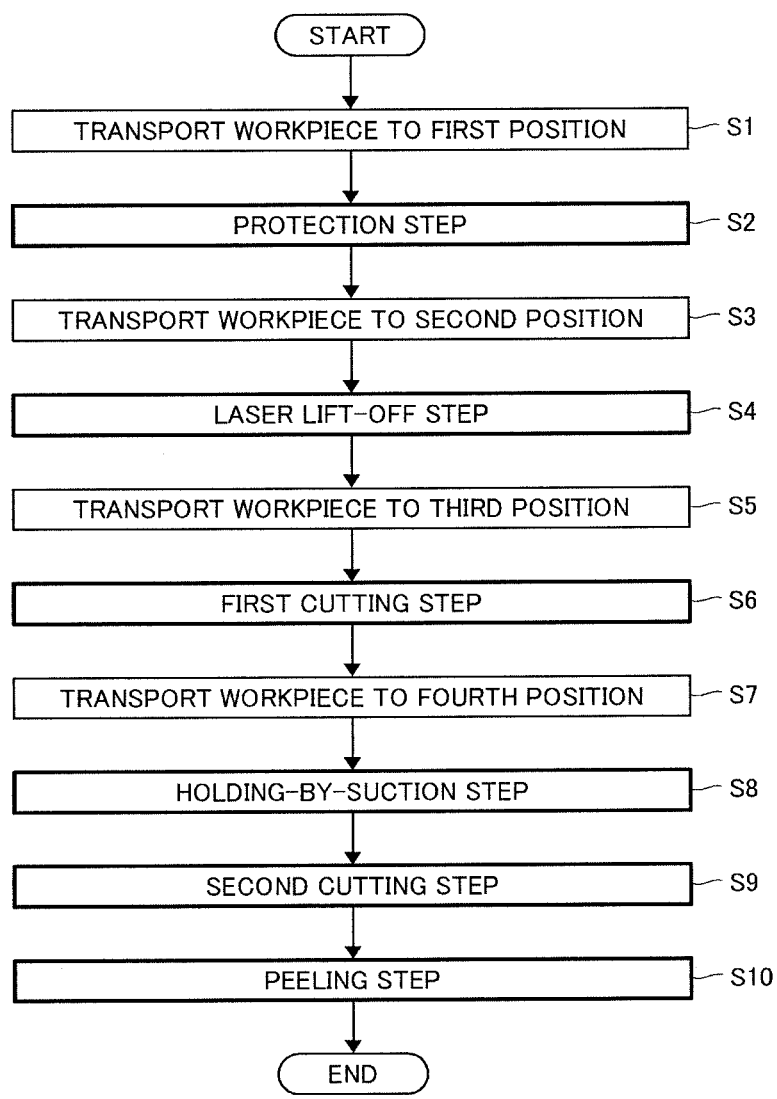
FIG. 2 is a flowchart of a separation method according to an embodiment of the present invention.

FIG. 2 shows a flowchart of the separation method according to the embodiment. As shown in the figure, the separation method according to the embodiment includes steps S1 through S10 to be executed sequentially. Of these, steps S8 through S10 are executed by a separation device 20A (see FIG. 5).

In step S1, the workpiece 1A is transported to a predetermined first position by a conveyor or suchlike. Thereafter, in step S2 (protection step), a protective film is affixed to the surface of the resin layer 3 of the workpiece 1A set in the first position.

Figure 3:
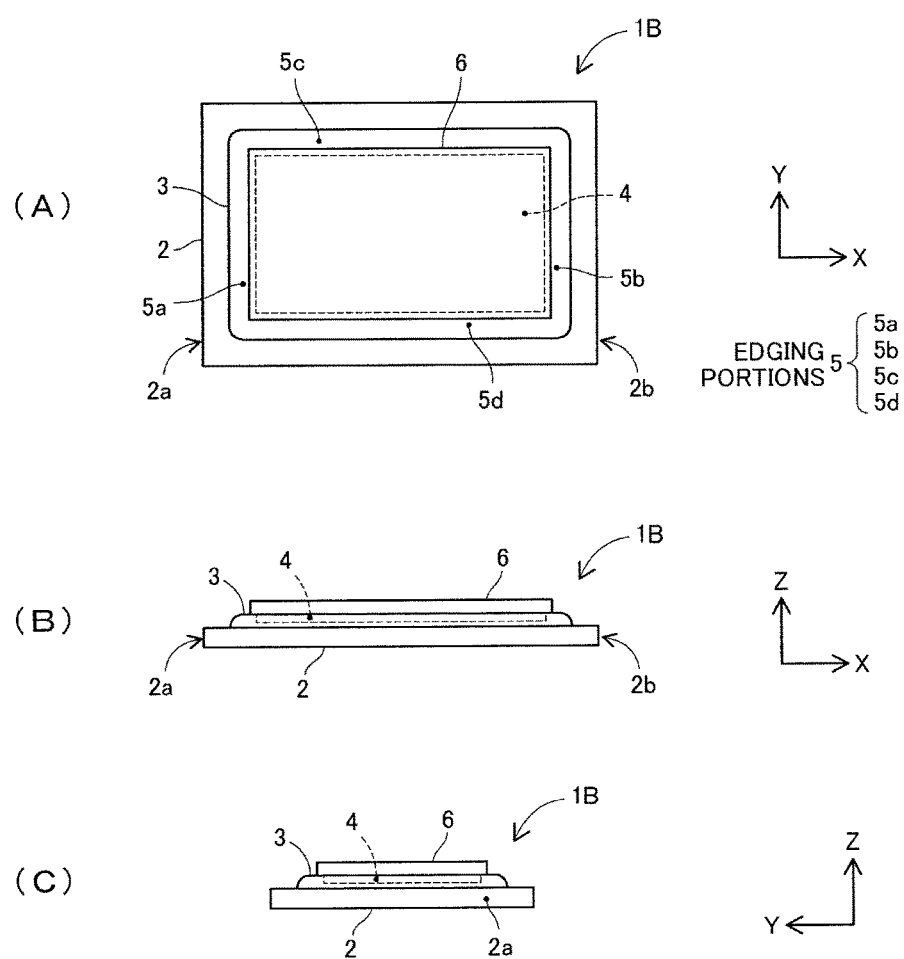
FIG. 3 provides (A) a top view, (B) a Y-axis-direction side view, and (C) an X-axis-direction side view of the workpiece subjected to protection step S2 included in the separation method according to the embodiment.

FIG. 3 illustrates the workpiece 1B subjected to step S2. As shown in the figure, the workpiece 1B consists of the carrier substrate 2, the resin layer 3, and the protective film 6 affixed to the surface of the resin layer 3. The protective film 6 completely covers the element portion 4. More specifically, the protective film 6 is larger in the X-axis and Y-axis directions than the element portion 4. On the other hand, the protective film 6 is smaller in the X-axis and Y-axis directions than the resin layer 3. Accordingly, even after the affixing of the protective film 6, the edging portions 5a, 5b, 5c, and 5d are exposed in part.

In the present embodiment, as the protective film 6, a polyethylene film (PE) with a thickness of from 30 to 100 µm is used. The protective film 6 may be a polyethylene terephthalate (PET), polyolefin (PO), polypropylene (PP), polystyrene (PS) or polyvinyl chloride (PVC) film.

In step S3, the workpiece 1B is transported to a predetermined second position by the conveyor or suchlike. Thereafter, in step S4 (laser lift-off step), the resin layer 3 is irradiated with a laser beam from the back side of the carrier substrate 2 included in the workpiece 1B set in the second position. As a result, the bond between the carrier substrate 2 and the resin layer 3 is broken. However, the edging portions 5 of the resin layer 3 typically form a stronger bond with the carrier substrate 2 than do other portions. Accordingly, even after the execution of step S4, the edging portions 5 of the resin layer 3 and the carrier substrate 2 might remain weakly bonded.

In step S5, the workpiece 1B is transported to a predetermined third position by the conveyor or suchlike. In step S6 (first cutting step), cuts 7 are provided in three edging portions, 5b, 5c, and 5d, of the resin layer 3 included in the workpiece 1B set in the third position. Thereafter, in step S7, the workpiece 1C with the cuts 7 is transported to a predetermined fourth position by the conveyor or suchlike.

Steps S5, S6, and S7 will be described in more detail with reference to FIG. 4.

Figure 4:
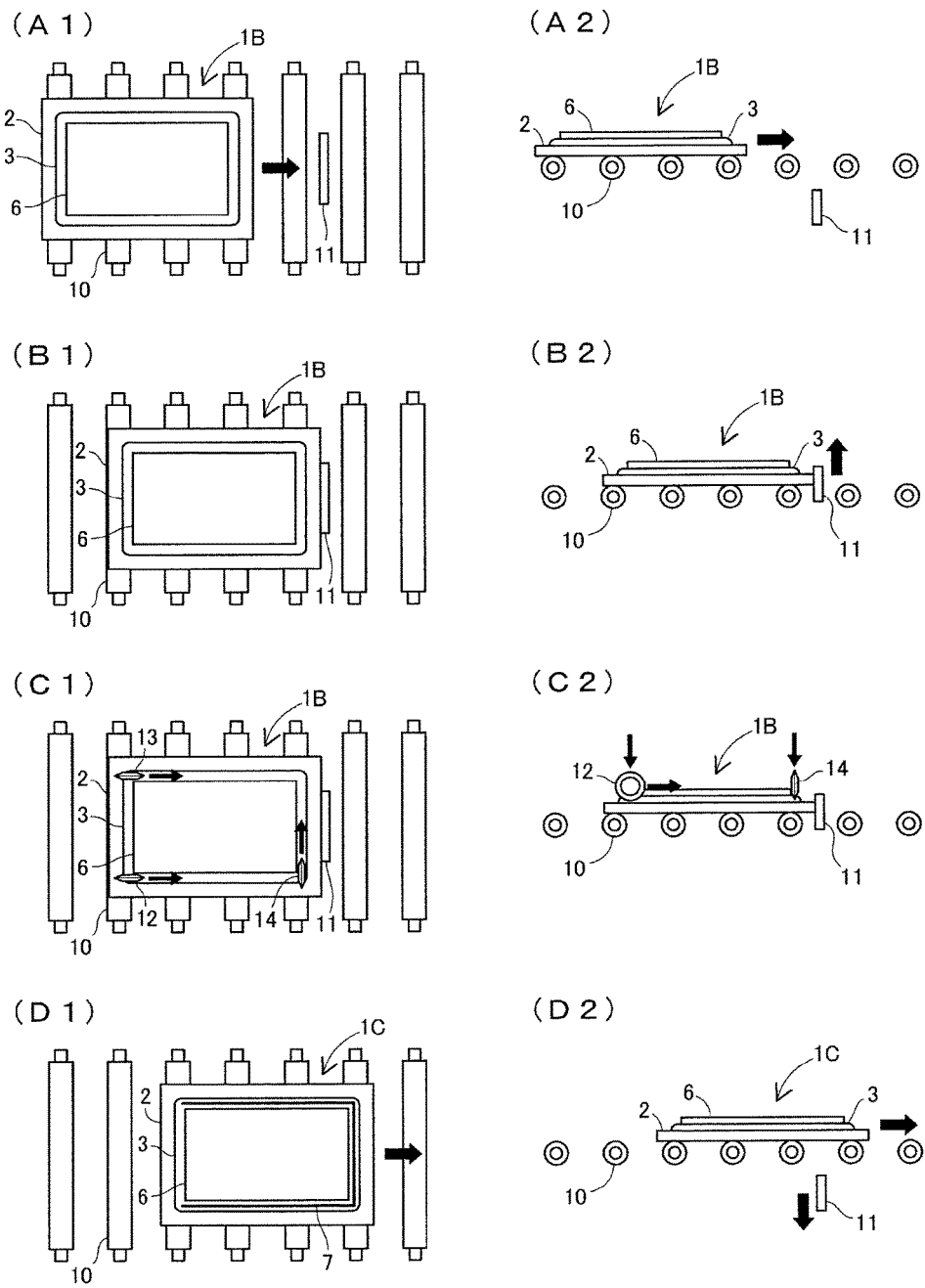
FIG. 4 provides diagrams mainly illustrating the procedure for first cutting step S6 included in the separation method according to the embodiment.

Initially, the workpiece 1B, which has been transported by the conveyor consisting of a plurality of conveyor rollers 10 arranged at equal intervals, is set in the third position using a positioning plate 11 elevated between a pair of adjacent conveyor rollers 10 (see FIGS. 4(A1), 4(A2), 4(B1), and 4(B2)). Next, a first cutter 12 is lowered so as to bite into the end of the edging portion 5d that is proximal to the edging portion 5a, a second cutter 13 is lowered so as to bite into the end of the edging portion 5c that is proximal to the edging portion 5a, a third cutter 14 is lowered so as to bite into the end of the edging portion 5b that is proximal to the edging portion 5d, and by running these cutters, the cuts 7 are provided in the three edging portions 5b, 5c, and 5d, excluding the edging portion 5a (see FIGS. 4 (C1) and 4(C2). Thereafter, the positioning plate 11 is lowered, and the workpiece 1C with the cuts 7 is transported to the fourth position (see FIGS. 4(D1) and 4(D2)).

In the present embodiment, each of the cutters 12, 13, and 14 is a round blade, but the configuration of the cutters 12, 13, and 14 is not limited to this. For example, to provide a cut 7 in the form of a groove with a predetermined width, two adjacently arranged round blades may be used.

Next, the separation device 20A responsible for the execution of steps S8 through S10 will be described with reference to FIGS. 5 to 7.

Figure 5:
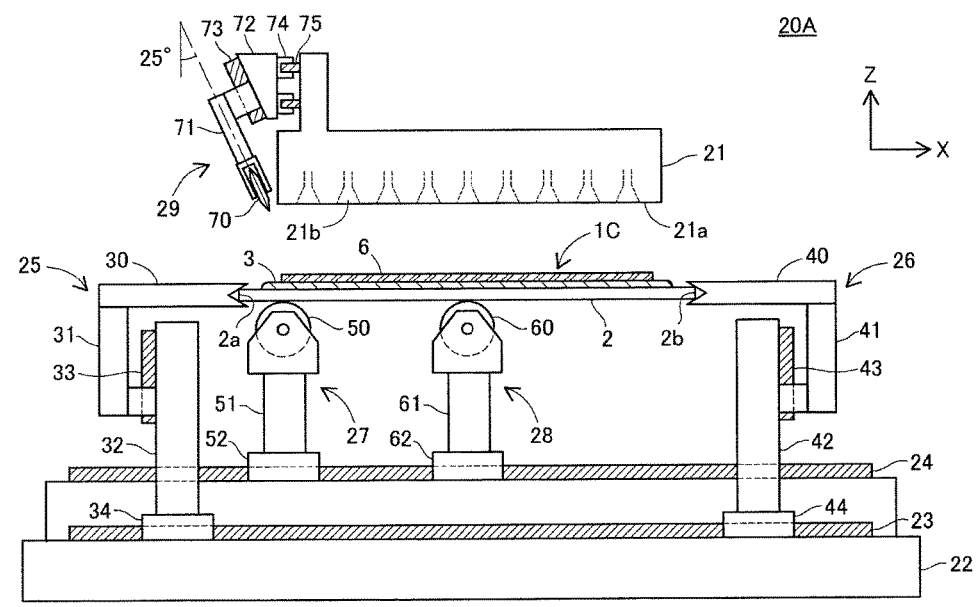
FIG. 5 is a schematic. Y-axis-direction side view of a separation device responsible for holding-by-suction step S8, second cutting step S9, and peeling step S10 included in the separation method according to the embodiment.

As shown in FIG. 5, the separation device 20A includes a suction stage 21. The suction stage 21 includes a flat suction surface 21a facing down and a plurality of suction nozzles 21b provided in the suction surface 21a. The suction nozzles 21b are connected to a pump 81, which operates under control of a control portion 80A, whereby the resin layer 3 of the workpiece 1C is held by suction on the suction surface 21a with the protective film 6 positioned therebetween (see FIG. 7).

Figure 6:
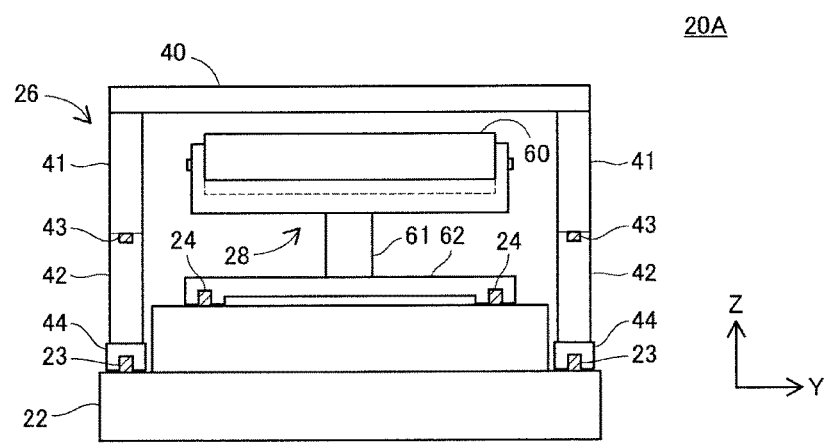
FIG. 6 is a schematic X-axis-direction side view of a part of the separation device shown in FIG. 5.

As shown in FIGS. 5 and 6, the separation device 20A includes a base 22, two outer guides 23 provided on a lower top of the base 22, and two inner guides 24 provided on an upper top of the base 22. Both the outer guides 23 and the inner guides 24 extend in the X-axis direction. Moreover, the upper top of the base 22 (and the two inner guides 24) are located between the two outer guides 23.

As shown in FIG. 5, the separation device 20A further includes a first-end support unit 25, a second-end support unit 26, a first-support-roller unit a second-support-roller unit 28, and a fourth-cutter unit 29.

The first-end support unit 25 includes a first pillow 30, which corresponds to the "first-end support" of the present invention, No. 1 first-pillow supports 31, No. 2 first-pillow supports 32, guides 33, and first-pillow runner means 34. The first pillow 30 supports the first end 2a of the carrier substrate 2 by means of a V-shaped end surface, thereby regulating up and down movement of the first end 2a. The first pillow 30 is fixed to the No. 1 first pillow supports 31. The No. 1 first-pillow supports 31 are slidably attached to the guides 33 provided on one side of the respective No. 2 first-pillow supports 32. Moreover, the No. 2 first-pillow supports 32 are fixed to the respective first-pillow runner means 34, which are adapted to run along the outer guides 23.

As the No. 1 first-pillow supports 31, under control of the control portion 80A, slide up or down relative to the No. 2 first-pillow supports 32, the first pillow 30 correspondingly moves up or down (i.e., ascends or descends) while supporting the first end 2a of the carrier substrate 2. Therefore, the No. 1 first-pillow supports 31, the No. 2 first-pillow supports 32, and the guides 33 can be said to constitute a "first-pillow raising/lowering means" for raising/lowering the first pillow 30.

Furthermore, as the first-pillow runner means 34, under control of the control portion 80A, run along the outer guides 23, the distance between the V-shaped end surface of the first pillow 30 and a V-shaped end surface of a second pillow 40 changes, so that the workpiece 1C is secured or released.

The second-end support unit 26 includes the second pillow 40, which corresponds to the "second-end support" of the present invention, No. 1 second-pillow supports 41, No. 2 second-pillow supports 42, guides 43, and second-pillow runner means 44. The second pillow 40 supports the second end 2b of the carrier substrate 2 by means of the V-shaped end surface, thereby regulating up and down movement of the second end 2b. The second pillow 40 is fixed to the No. 1 second-pillow supports 41. The No. 1 second-pillow supports 41 are slidably attached to the guides 43 provided on one side of the respective No. 2 second-pillow supports 42. Moreover, the No. 2 second-pillow supports 42 are fixed to the respective second-pillow runner means 44, which are adapted to run along the outer guides 23.

As the No. 1 second-pillow supports 41, under control of the control portion 80A, slide up or down relative to the No. 2 second-pillow supports 42, the second pillow 40 correspondingly moves up or down (i.e., ascends or descends) while supporting the second end 2b of the carrier substrate 2, Therefore, the No. 1 second-pillow supports 41, the No. 2 second-pillow supports 42, and the guides 43 can be said to constitute a "second-pillow raising/lowering means" for raising/lowering the second pillow 40.

Furthermore, as the second-pillow runner means 44, under control of the control portion 80A, run along the outer guides 23, the distance between the V-shaped end surface of the first pillow 30 and the V-shaped end surface of the second pillow 40 changes, so that the workpiece 1C is secured or released.

The first-support-roller unit 27 includes a first support roller 50, a first-support-roller raising/lowering means 51, and a first-support-roller runner means 52. The first support roller 50 supports the back surface of the carrier substrate 2 from below. The first support roller 50 is rotatably attached to an upper end of the first-support-roller raising/lowering means 51, which includes a cylinder and other elements. Moreover, the first-support-roller raising/lowering means 51 is fixed to the first-support-roller runner means 52, which is adapted to run along the inner guides 24.

As the cylinder included in the first-support-roller raising/lowering means 51 extends or contracts under control of the control portion 80A, the first support roller 50 correspondingly moves up or down (i.e., ascends or descends). As a result, the first support roller 50 is set at an arbitrary Z-axis position to support the workpiece 1C (i.e., the carrier substrate 2) or press the workpiece 1C against the suction surface 21a of the suction stage 21.

Furthermore, as the first-support-roller runner means 52, under control of the control portion 80A, runs along the inner guides 24, the first support roller 50 moves in the X-axis direction. That is, the first support roller 50 can support or press the carrier substrate 2 at an arbitrary X-axis position between the first end 2a and the second end 2b.

The second-support-roller unit 28 includes a second support roller 60, a second-support-roller raising/lowering means 61, and a second-support-roller runner means 62. The second support roller 60 supports the back surface of the carrier substrate 2 from below at an X-axis position closer to the second end 2b than is the first support roller 50. The second support roller 60 is rotatably attached to an upper end of the second-support-roller raising/lowering means 61, which includes a cylinder and other elements. Moreover, the second-support-roller raising/lowering means 61 is fixed to the second-support-roller runner means 62, which is adapted to run along the inner guides 24.

As the cylinder included in the second-support-roller raising/lowering means 61 extends or contracts under control of the control portion 80A, the second support roller 60 correspondingly moves up or down ascends or descends). As a result, the second support roller 60 is set at an arbitrary Z-axis position to support the workpiece 1C (i.e., the carrier substrate 2) or press the workpiece 1C against the suction surface 21a of the suction stage 21.

Furthermore, as the second-support-roller runner means 62, under control of the control portion 80A, runs along the inner guides 24, the second support roller 60 moves in the X-axis direction. That is, the second support roller 60 can support or press the carrier substrate 2 at an arbitrary X-axis position between the first support roller 50 and the second end 2b.

As shown in FIG. 6, the second-end support unit 26 has a squared, inverted U-shape. Accordingly, the first-support-roller unit 27 and the second-support-roller unit 28 can move under the second pillow 40 to waiting positions. Likewise, the first-end support unit 25 also has a squared, inverted U-shape, Therefore, the first-support-roller unit 27 and the second-support-roller unit 28 can move under the first pillow 30 to other waiting positions.

The fourth-cutter unit 29 includes a fourth cutter 70, a No. 1 fourth-cutter support 71, a No. 2 fourth-cutter support 72, a guide 73, and fourth-cutter runner means 74. The fourth cutter 70 is attached to a lower end of the No. 1 fourth-cutter support 71. Moreover, the No. 1 fourth-cutter support 71 is slidably attached to the guide 73 provided on a side surface of the No. 2 fourth-cutter support 72 that is tilted 25° with respect to the Z-axis direction. The No. 2 fourth-cutter support 72 is fixed to the fourth-cutter runner means 74, which are adapted to run along guides 75 provided to the suction stage 21. The guides 75 extend in the Y-axis direction. Note that the angle of 25° is merely an example. The side surface of the No. 2 fourth-cutter support 72 on which the guide 73 is provided may be parallel to the Z-axis direction.

As the No. 1 fourth-cutter support 71, under control of the control portion 80A, slides relative to the No. 2 fourth-cutter support 72, the fourth cutter 70 also moves (either ascends or descends) in a direction tilted 25° from the Z-axis direction. Therefore, the No. 1 fourth-cutter support 71, the No. 2 fourth-cutter support 72, and the guide 73 can be said to constitute a "fourth-cutter raising/lowering means" for raising or lowering the fourth cutter 70.

Furthermore, as the fourth-cutter runner means 74, under control of the control portion 80A, move along the guides 75, the fourth cutter 70 moves in the Y-axis direction.

Figure 10:
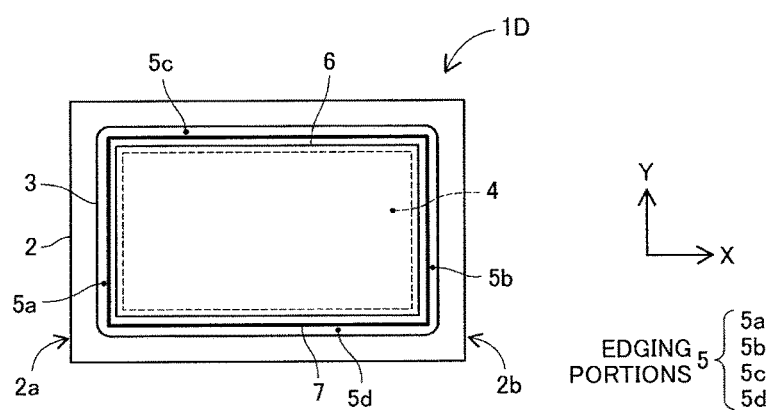
FIG. 10 is a top view of the workpiece subjected to second cutting step S9 included in the separation method according to the embodiment.

In the present embodiment, the fourth cutter 70 is a round blade, but the configuration of the fourth cutter 70 is not limited to this. For example, to provide a cut 7 (see FIG. 10) in the form of a groove with a predetermined width, two adjacently arranged round blades may be used.

Figure 7:
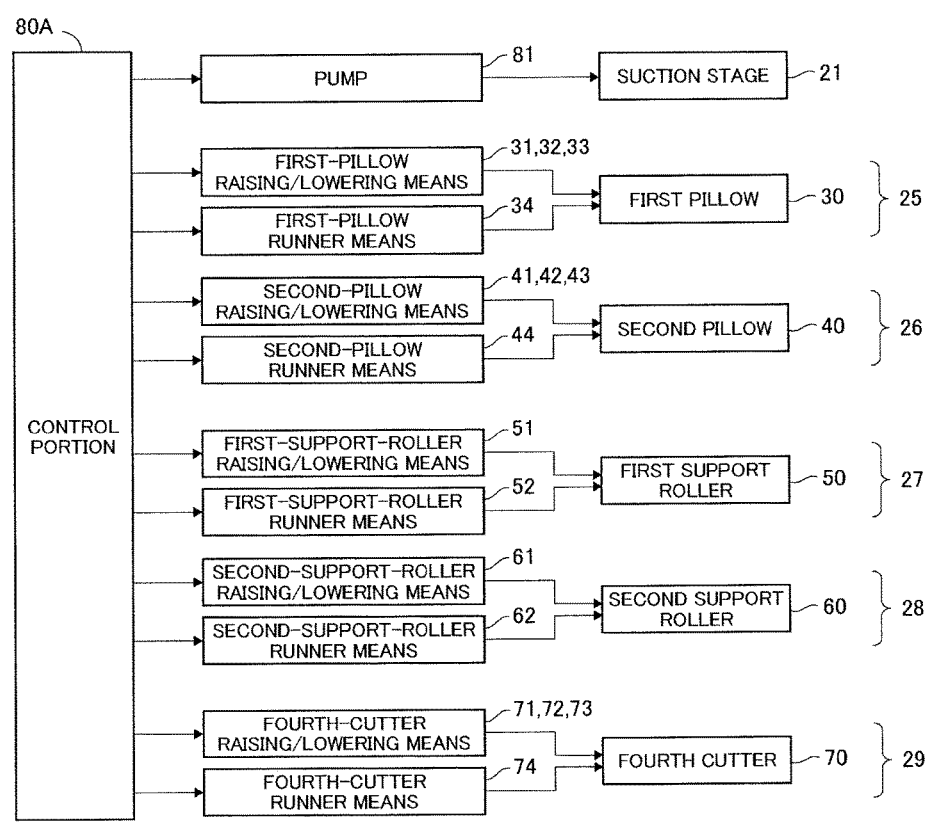
FIG. 7 is a control block diagram of the separation device shown in FIG. 5.

FIG. 7 shows a control block diagram of the separation device 20A according to the present embodiment. As shown in the figure, the control portion 80A controls (1) the pump 81 connected to the suction stage 21, (2) the first-end support unit 25 consisting of the first pillow 30, the first-pillow raising/lowering means, 31, 32, and 33, and the first-pillow runner means 34, (3) the second-end support unit 26 consisting of the second pillow 40, the second-pillow raising/lowering means, 41, 42, and 43, and the second-pillow runner means 44, (4) the first-support-roller unit 27 consisting of the first support roller 50, the first-support-roller raising/lowering means 51, and the first-support-roller runner means 52, (5) the second-support-roller unit 28 consisting of the second support roller 60, the second-support-roller raising/lowering means 61, and the second-support-roller runner means 62, and (6) the fourth-cutter unit 29 consisting of the fourth cutter 70, the fourth-cutter raising/lowering means, 71, 72, and 73, and the fourth-cutter runner means 74.

Figure 8:
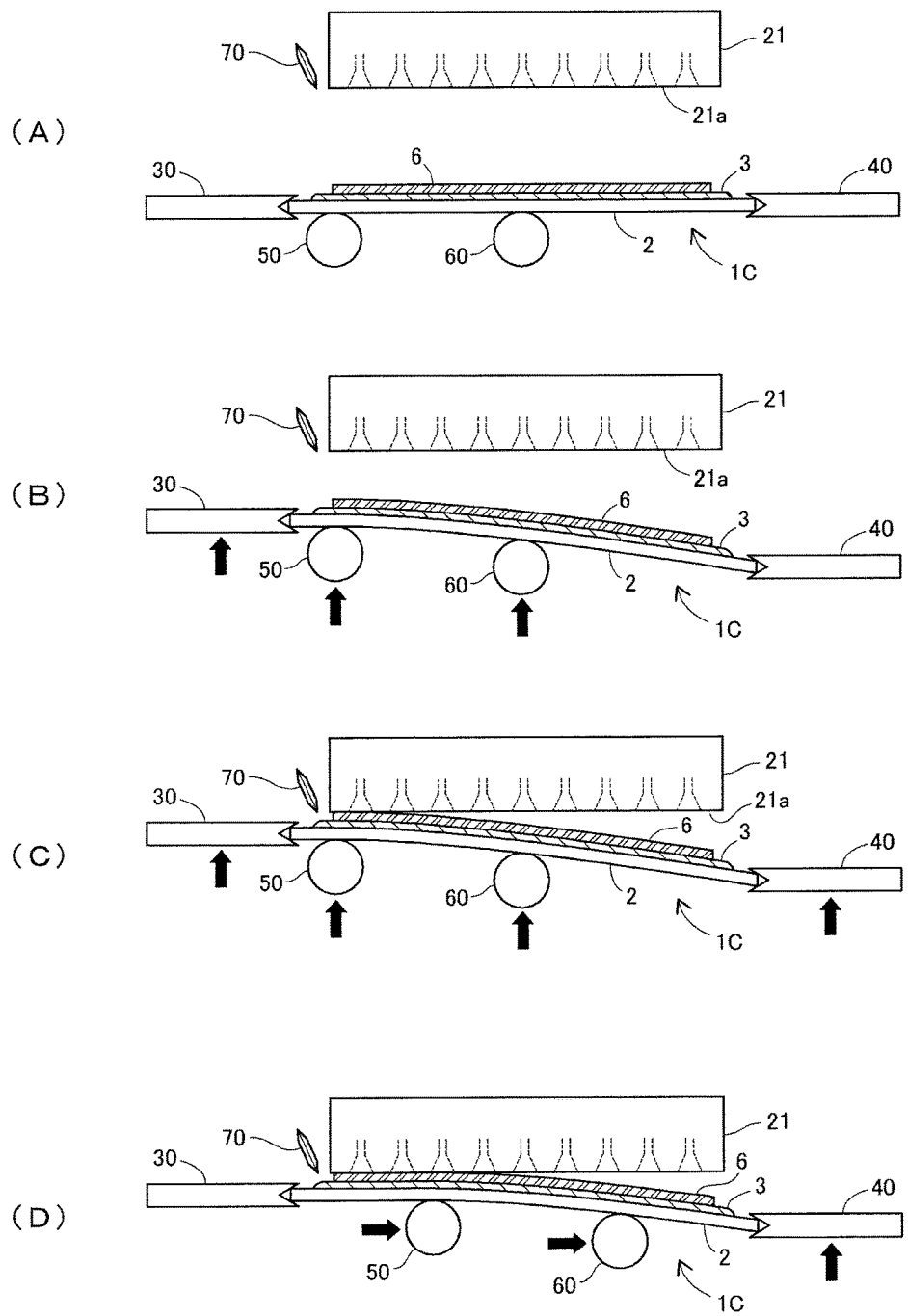
FIG. 8 provides diagrams illustrating the procedure for holding-by-suction step S8 included in the separation method according to the embodiment.

Next, step S8 (holding-by-suction step), which is executed by the separation device 20A, will be described with reference to FIG. 8. Note that in FIG. 8, some components and reference characters are omitted. The same applies to FIGS. 9 and 11.

FIG. 8(A) illustrates the initial state in step S8, In this state, the suction surface 21a of the suction stage 21 and the workpiece 1C are vertically apart from each other. Moreover, the first pillow 30 and the second pillow 40 are at the same height, and the first support roller 50 and the second support roller 60 support the back surface of the carrier substrate 2 from below, whereby the workpiece 1C is maintained parallel to the suction surface 21a of the suction stage 21 without sagging under its own weight.

FIG. 8(B) illustrates a state after the first pillow 30 and the first support roller 50 in the initial state shown in FIG. 8(A) were raised substantially the same amount, and the second support roller 60 was raised a smaller amount, so that the workpiece 1C was placed in a predetermined curved posture.

In this state, the second pillow 40 supports the second end 2b at a position lower than the first end 2a, and the second support roller 60 supports the carrier substrate 2 at a position lower than the first end 2a but higher than the second end 2b.

FIG. 8(C) illustrates a state after the first pillow 30, the first support roller 50, the second support roller 60, and the second pillow 40 in the state shown in FIG. 8(B) were raised the same amount, so that only a portion of the protective film 6 was held by suction on the suction surface 21a of the suction stage 21, Since the first pillow 30, the first support roller 50, the second support roller 60, and the second pillow 40 were raised the same amount, the workpiece 1C remains in the predetermined curved posture.

FIG. 8(D) illustrates a state after the first support roller 50 and the second support roller 60 in the state shown in FIG. 8(C) ran in the X-axis direction at the same speed while the second pillow 40 was slightly raised in order to prevent the workpiece 1C from curving excessively. The workpiece 1C in a curved state is held by suction on the suction surface 21a of the suction stage 21, whereby it is possible to prevent the protective film 6 and the resin layer 3 from being wrinkled and also possible to prevent air from being trapped between the protective film 6 and the suction surface 21a.

Thereafter, when the first support roller 50 reaches the vicinity of the second end 2b of the carrier substrate 2, step S8 ends. Note that at this time, the second support roller 60 is at the waiting position after moving under the second pillow 40.

Figure 9:
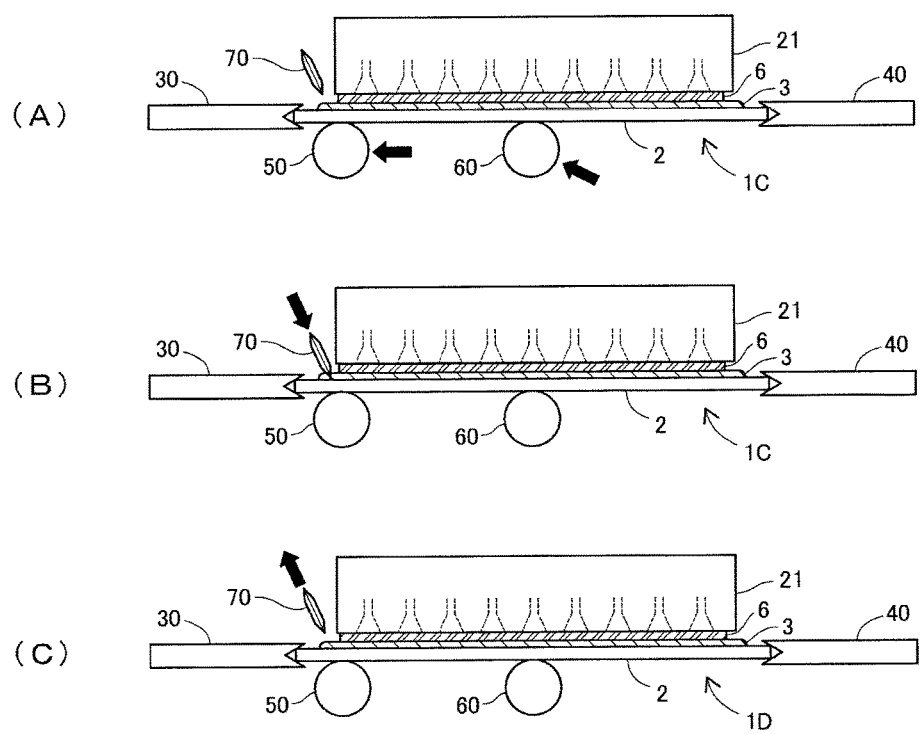
FIG. 9 provides diagrams illustrating the procedure for second cutting step S9 included in the separation method according to the embodiment.

Next, step S9 (second cutting step), which is executed by the separation device 20A, will be described with reference to FIG. 9.

FIG. 9(A) illustrates the initial state in step S9 after the first support roller 50 and the second support roller 60 moved following the end of step S8. In this state, the first support roller 50 supports the back surface of the carrier substrate 2 in the vicinity of the first end 2a. Moreover, the second support roller 60 supports the hack surface of the carrier substrate 2 substantially at the midpoint between the first end 2a and the second end. 2b. Note that supporting the back surface of the carrier substrate 2 by the first support roller 50 in the vicinity of the first end 2a corresponds to the "supporting step" of the present invention.

FIG. 9(B) illustrates a state after the fourth cutter 70 in the initial state shown in FIG. 9(A) was lowered so as to bite into the edging portion 5a of the resin layer 3 (see FIG. 3). The carrier substrate 2 is securely supported by the first support roller 50 in the vicinity of the first end 2a. Accordingly, when the fourth cutter 70 is lowered, the first end 2a of the carrier substrate 2 does not fall off from the first pillow 30.

FIG. 9(C) illustrates a state after the fourth cutter 70 in the state shown in FIG. 9(B) ran in the Y-axis direction to provide a cut 7 in the edging portion 5a of the resin layer 3 and thereafter was raised. In this manner, cuts 7 are provided in the workpiece 1C so as to surround the element portion 4, resulting in a workpiece 1D (see FIG. 10).

If the cuts 7 are provided in all of the edging portions 5a, 5b, 5c, and 5d in step S6 (first cutting step), the positional relationship between the element portion 4 of the resin layer 3 and the carrier substrate 2 might be compromised in step S7 or S8. To prevent this, in the present embodiment, the cut 7 is provided in the edging portion 5a immediately before step S10 (peeling step) to be described later. In other words, in the present embodiment, the element portion 4 is kept connected to at least one of the edging portions 5 until immediately before step S10 (peeling step).

Figure 11:
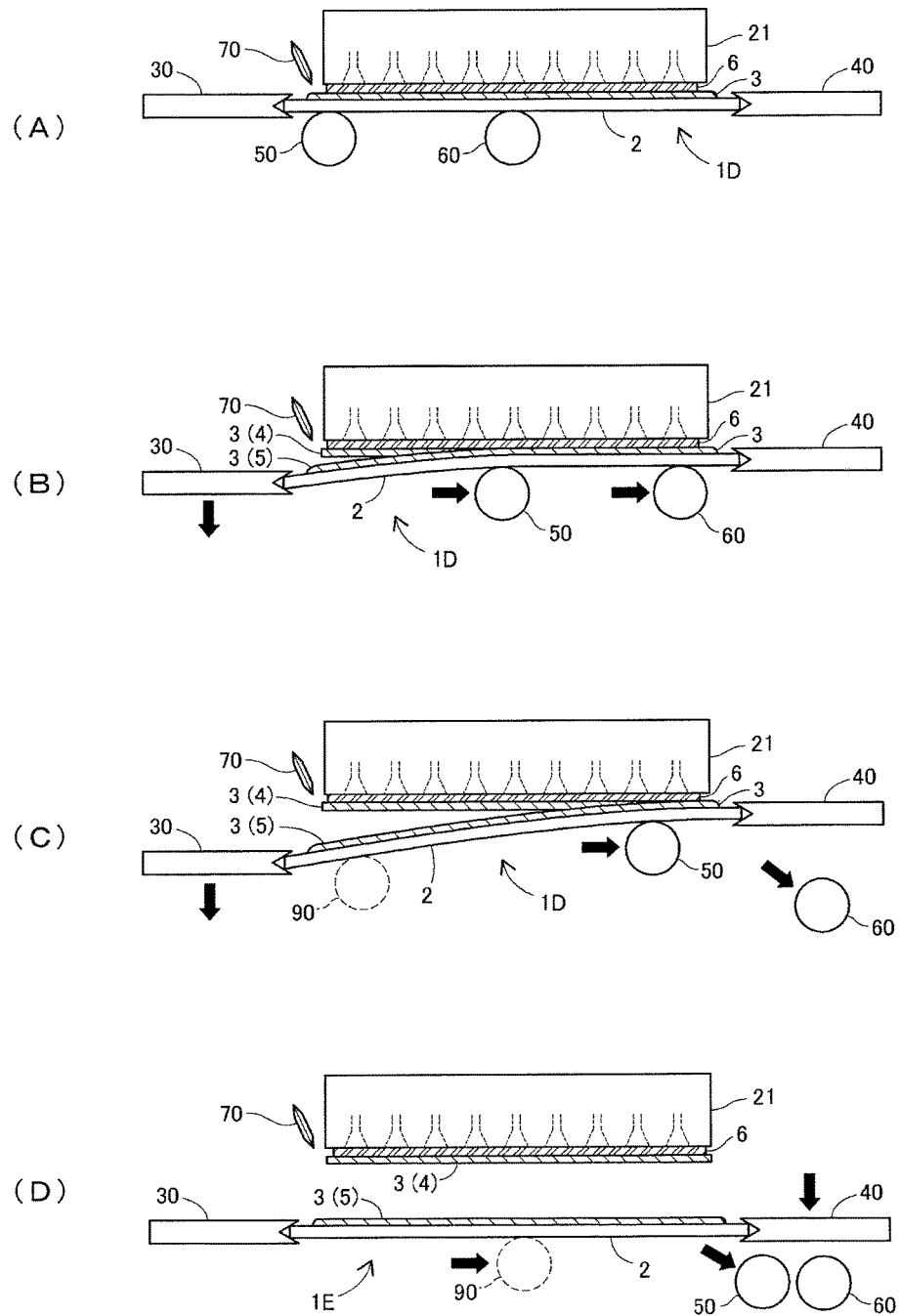
FIG. 11 provides diagrams illustrating the procedure for peeling step S10 included in the separation method according to the embodiment.

Next, step S10 (peeling step), which is executed by the separation device 20A, will be described with reference to FIG. 11.

FIG. 11(A) illustrates the initial state in step S10. As in the case of FIG. 9(A), in this state, the first support roller 50 supports the hack surface of the carrier substrate 2 in the vicinity of the first end 2a. Moreover, the second support roller 60 supports the back surface of the carrier substrate 2 substantially at the midpoint between the first end 2a and the second end 2b.

FIG. 11(B) illustrates a state after the first support roller 50 and the second support roller 60 in the initial state shown in FIG. 11(A) ran in the X-axis direction at the same speed while the first pillow 30 was lowered. As the first pillow 30 descends, the first end 2a of the carrier substrate 2 descends as well. Consequently, the carrier substrate 2 is placed in such a position as to be bent at the portion supported by the first support roller 50.

At this time, the part of the resin layer 3 that is located outside the cuts 7 in the edging portions 5 is bent together with the carrier substrate 2 to which that part remains affixed. On the other hand, the part that is located inside the cuts 7 and is mainly occupied by the element portion 4 is unbound from the carrier substrate 2 in step S4 (laser lift-off step) and therefore remains on the suction stage 21 (along with the protective film 6) without being bent together with the carrier substrate 2. That is, the element portion 4 of the resin layer 3 for use in a final product is separated from the carrier substrate 2. In other words, the carrier substrate 2, which is no longer necessary, is peeled off from the element portion 4 of the resin layer 3 for use in a final product.

FIG. 11(C) illustrates a state after the first support roller 50 in the state shown in FIG. 11(B) ran in the X-axis direction while the first pillow 30 was lowered, so that the separation of the carrier substrate 2 and the resin layer 3 (in particular, the element portion 4) further proceeded. In this state, the second support roller 60 is at the waiting position after moving under the second pillow 40.

Here, as the separation of the carrier substrate 2 and the resin layer 3 proceeds to a certain degree, a third support roller 90, which is shown neither in FIG. 5 nor 7, preferably supports the back surface of the carrier substrate 2. The third support roller 90 is positioned between the first support roller 50 and the first end 2a of the carrier substrate 2 to support the back surface of the carrier substrate 2, thereby preventing the first end 2a from falling off from the first pillow 30.

FIG. 11(D) illustrates a state upon completion of the separation (peeling). In this state, the first support roller 50 and the second support roller 60 have already moved to the waiting positions. Moreover, the element portion 4 of the resin layer 3 for use in a final product is completely separated from the carrier substrate 2.

Figure 12:
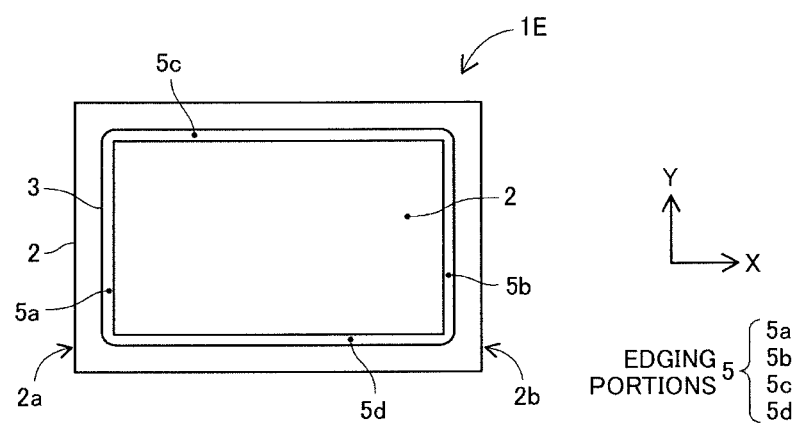
FIG. 12 is a top view of the workpiece subjected to peeling step S10 included in the separation method according to the embodiment.

It should be noted that in this state, the third support roller 90 described earlier preferably supports substantially the center of the carrier substrate 2. As a result, the workpiece 1E, which includes the carrier substrate 2 and the edging portions 5 of the resin layer 3 that remain on the carrier substrate 2 (see FIG. 12), can be prevented from sagging under its own weight.

After the separation from the carrier substrate 2, the element portion 4 of the resin layer 3 is firmly held by suction on the suction stage 21 with the protective film 6 positioned therebetween, and therefore, it is easy to affix a protective film to the surface (back surface) that was in contact with the carrier substrate 2 and also easy to transport the resin layer 3 to the next step by moving the suction stage 21.

While one embodiment of the separation method and device according to the present invention has been described above, the present invention is not limited to the configuration of the embodiment. Hereinafter, illustrative variants of the separation method and device according to the present invention will be described.

First Variant

Figure 13:
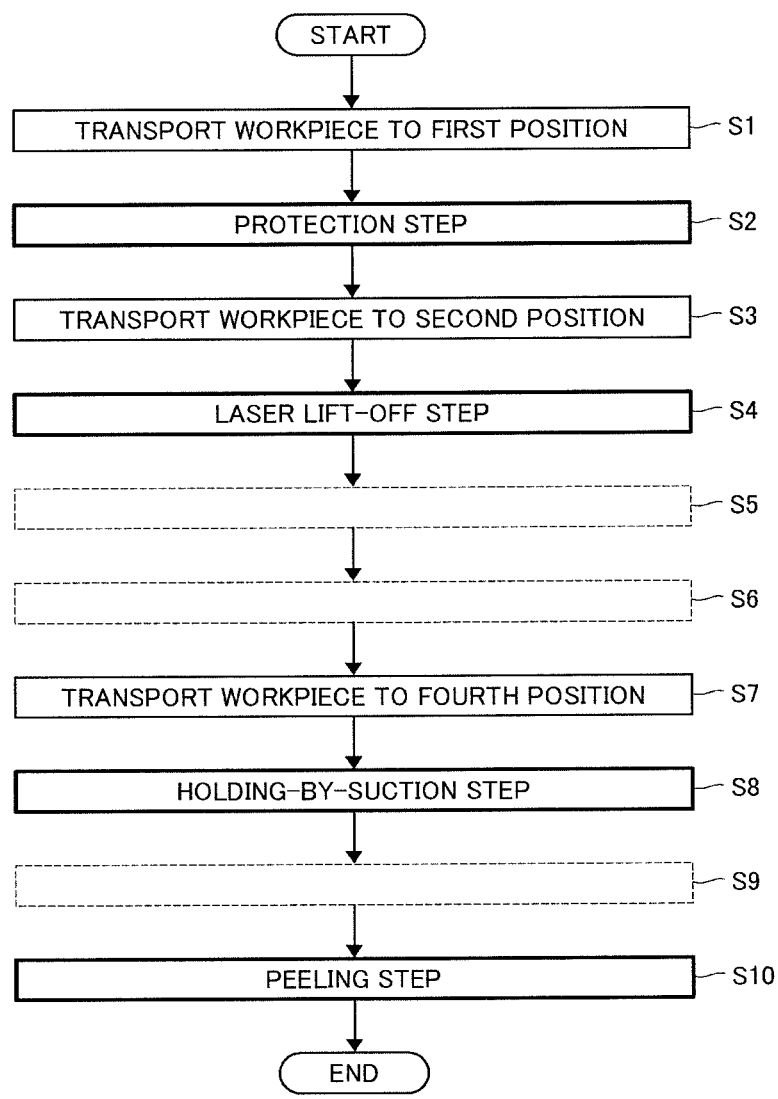
FIG. 13 is a flowchart of a separation method according to a first variant of the present invention.
Figure 14:
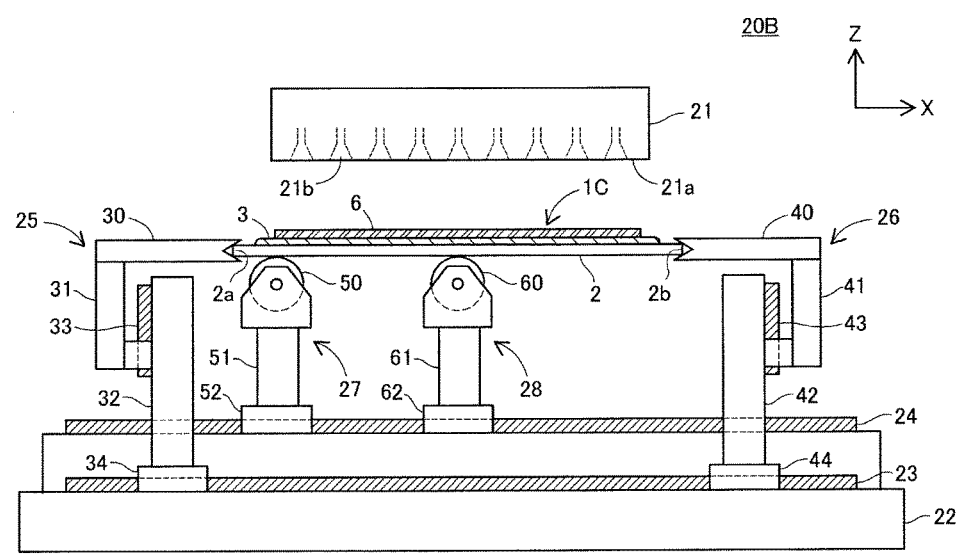
FIG. 14 is a schematic. Y-axis-direction side view of a separation device responsible for holding-by-suction step S8 and peeling step S10 included in the separation method according to the first variant.
Figure 15:
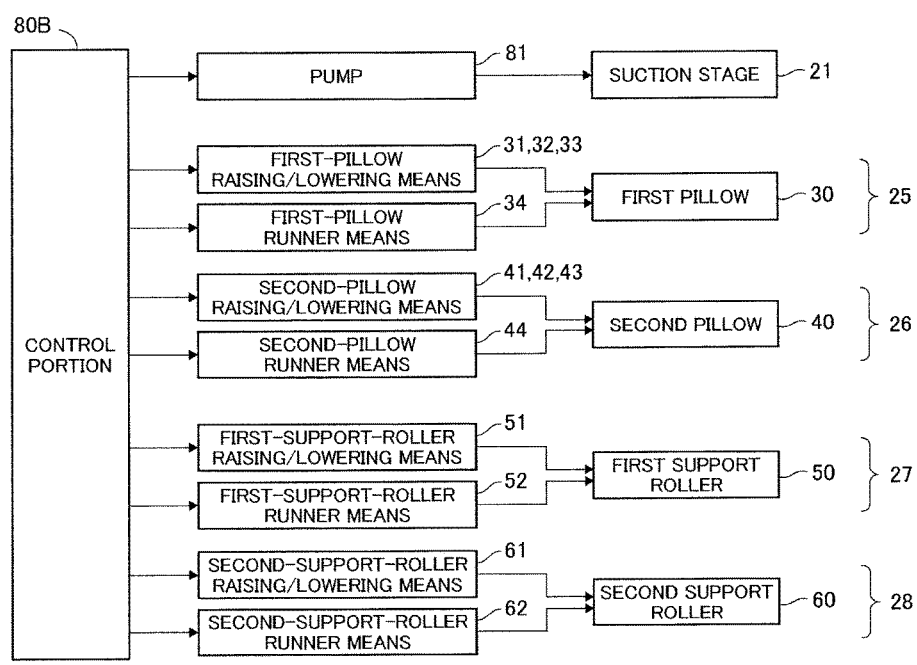
FIG. 15 is a control block diagram of the separation device shown in FIG. 14.

FIG. 13 shows a flowchart of a separation method according to a first variant of the present invention. As shown in the figure, the separation method according to the present variant includes none of the following steps: S5 (transportation to the third position), S6 (first cutting step), and S9 (second cutting step). Correspondingly, a separation device 20B according to the present variant dispenses with the fourth-cutter unit 29 (see FIG. 14). Accordingly, a control portion S0B does not perform control of the fourth-cutter unit 29 (see FIG. 15).

In the case where the bond between the edging portions 5 of the resin layer 3 and the carrier substrate 2 can be broken in step S4 (laser lift-off step), the steps and the device can be simplified by configuring the separation method and device as described above.

Second Variant

Figure 16:
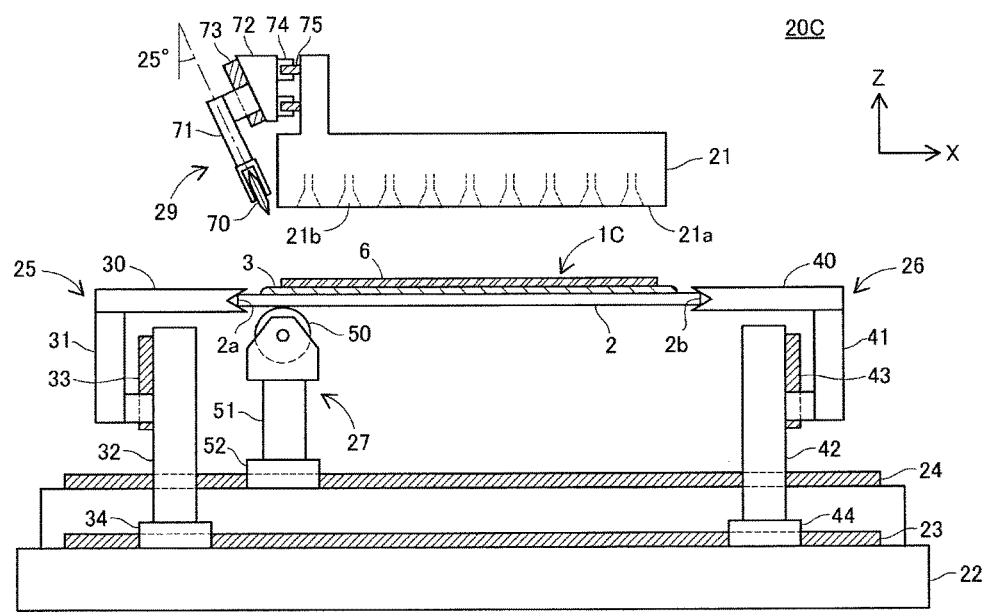
FIG. 16 is a schematic Y-axis-direction side view of a separation device responsible for holding-by-suction step S8, second cutting step S9, and peeling step S10 included in a separation method according to a second variant of the present invention.
Figure 17:
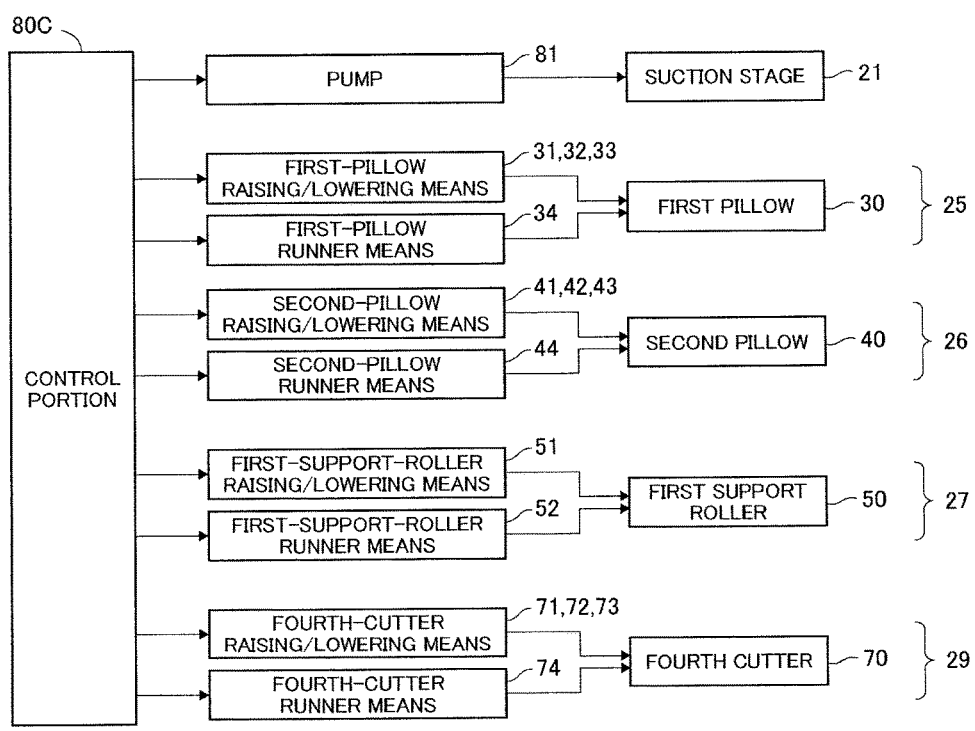
FIG. 17 is a control block diagram of the separation device shown in FIG. 16.

FIG. 16 illustrates a separation device 20C according to a second variant of the present invention. As shown in the figure, the separation device 20C according to the present variant does not include the second-support-roller unit 28. Accordingly, a control portion 80C does not perform control of the second-support-roller unit 28 (see FIG. 17).

In the case where the size of the workpiece 1C is relatively small, so that the sagging of the workpiece 1C under its own weight can be negligible, the device and the control by the device can be simplified by configuring the separation device as described above.

In contrast, in the case where the size of the workpiece 1C is relatively large, the sagging and the falling of the workpiece 1C can be reliably prevented by providing the second-support-roller unit 28 in plurality, in such a case, the third support roller 90 (see FIG. 11) is preferably provided in plurality as well.

Other Variants

Figure 18:
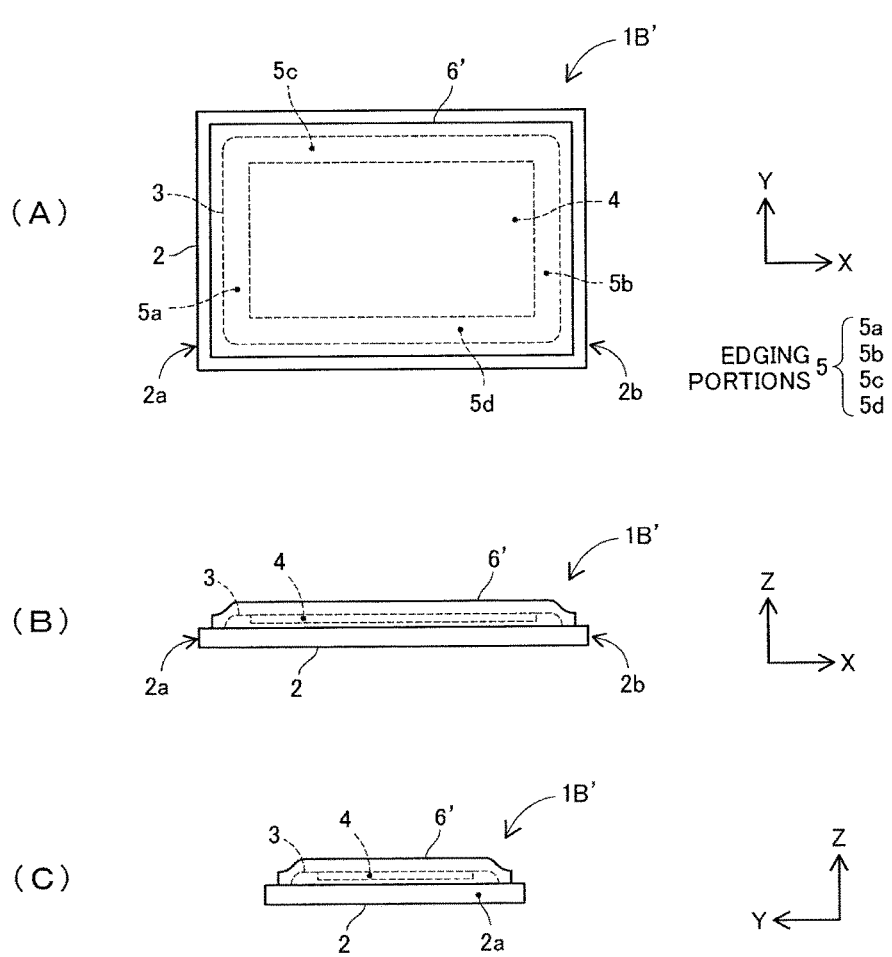
FIG. 18 provides (A) a top view, (B) a Y-axis-direction side view, and (C) X-axis-direction side view illustrating a variant of the workpiece shown in FIG. 3.

FIG. 18 illustrates a variant of the workpiece 1B shown in FIG. 3. In the case of the workpiece 1B' according to the variant, a protective film 6' completely covers the element portion 4 of the resin layer 3 and the edging portions 5, as shown in the figure. That is, the protective film 6' is larger in the X-axis and Y-axis directions than the resin layer 3. However, the protective film 6' is smaller in the X-axis and Y-axis directions than the carrier substrate 2.

In this case, the cutters 12, 13, and 14 in step S6 (first cutting step) and the fourth cutter 70 in step S9 (second cutting step) provide cuts 7 in the edging portions 5 of the resin layer 3 from above the protective film 6'. This configuration renders it possible to prevent chips of the resin of which the edging portions 5 are made from being scattered in providing the cuts 7.

Furthermore, in step S8 (holding-by-suction step), the second end 2b side (i.e., the second pillow 40 side) may be held by suction preceding any other portions, or the central portion, which is pushed up by the first support roller 50 to a higher level than any other portions, may be held by suction preceding those other portions. In the latter case, the first support roller 50 runs toward the first end 2a or the second end 2b and thereafter runs backwards.

Furthermore, the carrier substrate 2 may be made of an arbitrary material other than glass. However, the carrier substrate 2 needs to have translucency required in step S4 (laser lift-off step) as well as enough rigidity to be supportable by the first-end support unit 25 and the second-end support unit 26.

Furthermore, the resin layer 3 may be made of a resin other than polyimide.

Furthermore, these variants can be suitably combined.

DESCRIPTION OF THE REFERENCE CHARACTERS 1A, 1B, 1B', 1C, 1D, 1E workpiece
2 carrier substrate
2a first end (of carrier substrate)
2b second end (of carrier substrate)
3 resin layer
4 element portion
5, 5a, 5b, 5c, 5d edging portion
6, 6' protective film
7 cut
10 conveyor roller
11 positioning plate
12 first cutter
13 second cutter
14 third cutter
20A, 20B, 20C separation device
21 suction stage
21a suction surface
21b suction nozzle
22 base
23 outer guide
24 inner guide
25 first-end support unit
26 second-end support unit
27 first-support-roller unit
28 second-support-roller unit
29 fourth-cutter unit
30 first pillow
31 No. 1 first-pillow support (first-pillow raising/lowering means)
32 No. 2 first-pillow support (first-pillow raising/lowering means)
33 guide (first-pillow raising/lowering means)
34 first-pillow runner means
40 second pillow
41 No. 1 second-pillow support (second-pillow raising/lowering means)
42 No. 2 second-pillow support (second-pillow raising/lowering means)
43 guide (second-pillow raising/lowering means)
44 second-pillow runner means
50 first support roller
51 first-support-roller raising/lowering means
52 first-support-roller runner means
60 second support roller
61 second-support-roller raising/lowering means
62 second-support-roller runner means
70 fourth cutter 71 No. 1 fourth-cutter support (fourth-cutter raising/lowering means)
72 No. 2 fourth-cutter support (fourth-cutter raising/lowering means)
73 guide (fourth-cutter raising/lowering means)
74 fourth-cutter runner means
75 guide
80A, 80B, 80C control portion
81 pump
90 third support roller

The invention claimed is:

1. A separation method of separating a workpiece that consists of a rectangular carrier substrate having a first end and a second end opposite the first end, and a substantially rectangular resin layer formed on a surface of the carrier substrate, into the carrier substrate and the resin layer, the method comprising:
 a protection step for coating a surface of the resin layer with a substantially rectangular protective film having a third end and a fourth end parallel to the first end of the carrier substrate, the third end being closer to the first end of the carrier substrate than the fourth end;
 a holding-by-suction step for retaining by suction the resin layer coated with the protective film on a suction stage with a flat suction surface;
 a supporting step for causing a support roller to support a back surface of the carrier substrate, the support roller being capable of moving from the first end to the second end of the carrier substrate, the support roller supporting the back surface of the carrier substrate at a portion corresponding to the third end of the protective film or between the portion and the first end of the carrier substrate; and
 a peeling step for lowering the first end of the carrier substrate while moving the support roller toward the second end, thereby peeling the carrier substrate from the resin layer while bending the carrier substrate at the portion supported by the support roller.

2. The separation method according to claim 1, and forming the resin layer as a polyimide layer formed by application of a polyimide resin to the surface of the carrier substrate.

3. The separation method according to claim 1, and forming the resin layer to include a substantially rectangular element portion with an array of light-emitting elements formed therein, and surrounding the element portion with four edging portions.

4. The separation method according to claim 3, further comprising a laser lift-off step executed between the protection step and the holding-by-suction step to irradiate the resin layer with a laser beam from a back side of the carrier substrate, thereby breaking a bond between the resin layer and the carrier substrate.

5. A separation device for separating a workpiece that consists of a rectangular carrier substrate having a first end and a second end opposite the first end, and a substantially rectangular resin layer coated by a protective film and formed on a surface of the carrier substrate, into the carrier substrate and the resin layer, the device comprising:
 a suction stage for holding the workpiece on the resin layer side by suction of the protective film on the resin layer, the suction stage having a flat suction surface facing down;
 a support roller for supporting a back surface of the carrier substrate from below, the support roller being capable of moving from the first end of the carrier substrate included in the workpiece being held by suction toward the second end;
 a first-end support capable of ascending and descending in order to regulate up and down movement of the first end of the carrier substrate;
 a second-end support capable of ascending and descending in order to regulate up and down movement of the second end of the carrier substrate; and
 a control portion for controlling the movement of the support roller and the ascending and descending of the first-end support and the second-end support, the control portion moving the support roller toward the second end while lowering the first-end support, thereby lowering the first end of the carrier substrate, without raising or lowering the second-end support, whereby the carrier substrate is peeled from the resin layer while being bent at a portion supported by the support roller.

6. The separation device according to claim 5, wherein the resin layer is a polyimide layer formed by application of a polyimide resin to the surface of the carrier substrate.

7. The separation device according to claim 5, wherein the resin layer includes a substantially rectangular element portion with an array of light-emitting elements formed therein, and four edging portions surrounding the element portion.

* * * * *